Aug. 3, 1965     R. H. BISBING     3,198,231

HIGH STRENGTH THREADED INSERT

Filed Jan. 9, 1962     2 Sheets-Sheet 1

INVENTOR.
Robert H. Bisbing,
BY
Paul & Paul
ATTORNEYS.

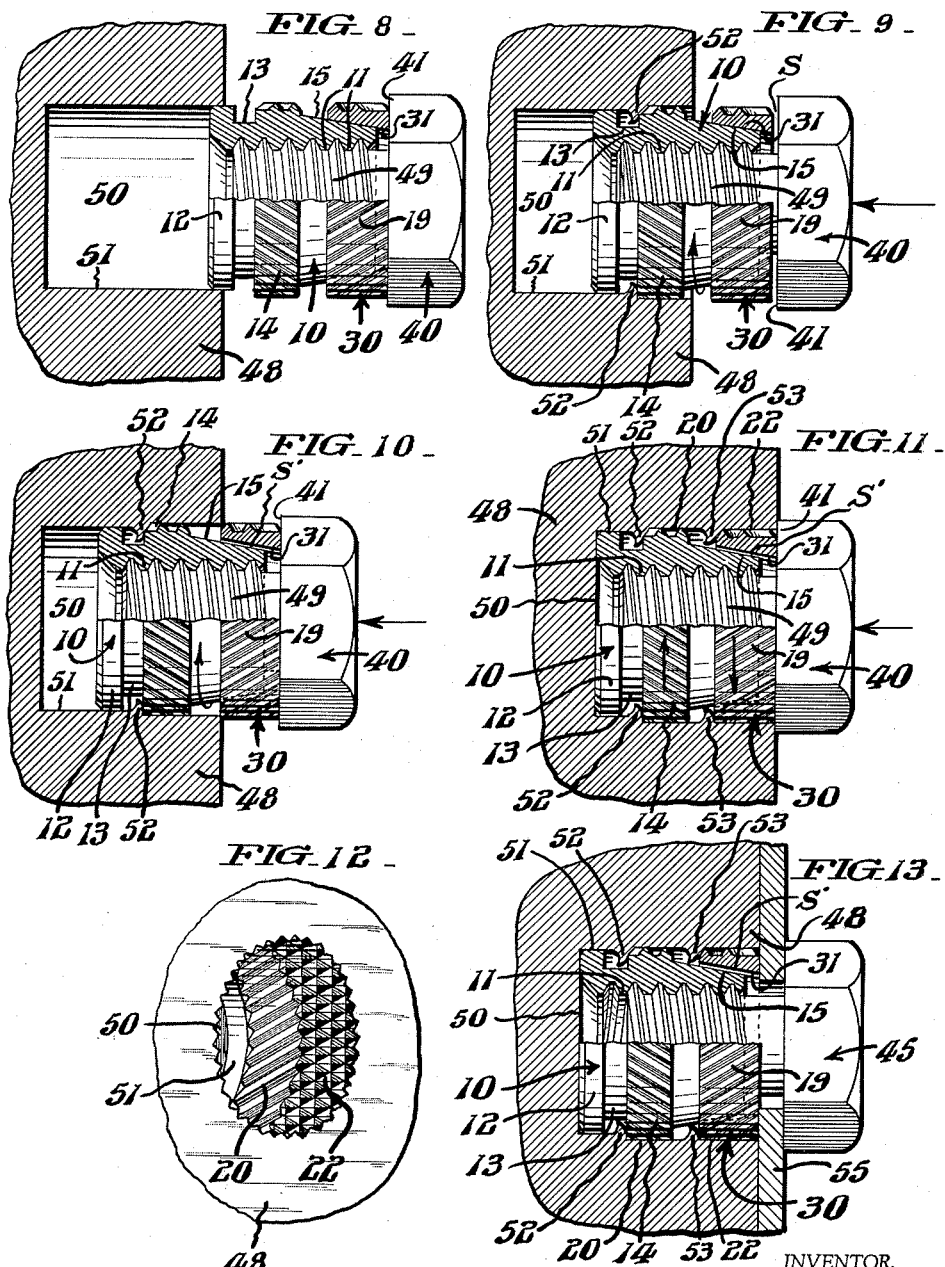

United States Patent Office 3,198,231
Patented Aug. 3, 1965

3,198,231
HIGH STRENGTH THREADED INSERT
Robert H. Bisbing, Upper Darby, Pa., assignor to South Chester Corporation, Chester, Pa., a corporation of Delaware
Filed Jan. 9, 1962, Ser. No. 165,164
4 Claims. (Cl. 151—41.73)

This invention relates to a threaded insert for materials and, in particular, to a high strength threaded insert which grips the sides of the bore in materials by novel means with unusual force.

Recent trends in modern construction have stressed the utilization of relatively soft metals, as well as various plastics and woods. It is well known in the art that an insert having high strength internal threads may be employed to provide a base or gripping means within such soft metals and other materials when the bore or hole to receive the insert is pre-tapped. The pre-tapping operation forms a series of threads in the bore so that the insert may be threaded into the hole. This operation requires a bore of uniform diameter and of the exact size to accommodate the threads of a particular insert. In addition, the pre-tapping step is time consuming and otherwise expensive. Further, such threaded inserts often are loosened by vibrations, causing the insert to back track along the threads and out of the hole.

Therefore, it is an object of this invention to provide an insert which may be used in an untapped hole in a relatively soft material.

It is another object of this invention to provide a high strength threaded insert which may be used in holes which are oversized or in otherwise unserviceable tapped holes.

It is another object of this invention to provide a high strength threaded insert which will grip the sides of the hole in soft materials with superior force so as to withstand greater vibrations and other forces than can be absorbed by comparable inserts of the known art.

The above objects are attained in the present invention in one of its embodiments by the provision of an internally threaded insert consisting of two components which are frictionally locked together when inserted. The first component consists of an internally threaded tubular shaped plug having, on the outside surface, a multiplicity of helical serrations or threads which are oriented in the same direction as the internal threads, and having also on the outside surface, a tapering portion forming the end of the plug. The second component is ring shaped having a tapering inner surface adapted to fit around the tapering portion of the plug. The ring has similar helical serrations on the outside surface oriented in the opposite direction. When the assembled insert is pushed into a pre-drilled hole in a material, the serrations of the plug form helical grooves in the walls of the hole in one direction. When forces are applied to remove the insert, the plug back tracks along its grooves until the two tapering portions become frictionally engaged. Since the ring can only turn in a direction opposite to that of the plug, because of its grooves, the insert is held firmly in place.

The aforementioned and additional advantages will become apparent herein and in the drawings in which:

FIG. 8 is a side elevational view, partly in section, showing the assembled insert being first pressed into the pre-bored hole;

FIG. 9 is a view similar to FIG. 8, showing the cutting and rotating action of the plug component;

FIG. 10 is a view similar to FIGS. 8 and 9, showing the insert just before the ring component begins to cut into the sides of the hole;

FIG. 11 is a view similar to FIGS. 8, 9 and 10, showing the ring fully rotated and the insert in place;

FIG. 12 is a perspective view showing the two types of serrations formed in the sides of the hole by the insert of this invention;

FIG. 13 is a side elevational view, partly in section, showing the fully positioned insert, attached structure and a fastening bolt.

Figure 1:
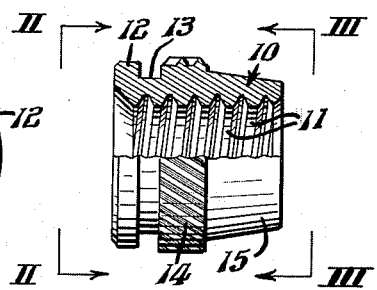
FIG. 1 is a side view in elevation, partly cut away, showing one specific embodiment of the plug component of this invention.
Figure 7:
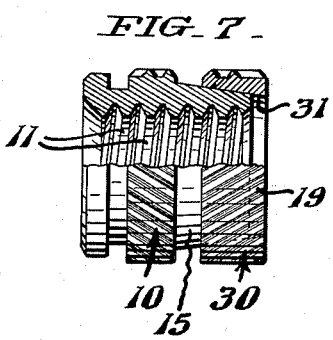
FIG. 7 is a side elevational view, partly in section, of one specific form of the ring and plug components showing them assembled prior to insertion.

One specific form of the insert of this invention is shown assembled in FIG. 7 and consists of a plug component 10 and a ring component 30 which are held together for insertion by frictional contact existing between the two tapered surfaces 15 and 31. In FIG. 1, the generally tubular shaped plug component 10 is shown partly in section, disclosing a series of internal threads 11 which extend substantially the entire length of the plug and which are generally arranged with a uniform diameter so as to hold therein a threaded bolt or screw. Threads 11, along with the rest of plug 10, are fashioned from a high strength metal so that an attaching bolt will be held securely by the insert. Bolt 10, and ring 30, may have varying lengths so as to provide the most effective insert gripping means in relation to the body in which the insert is placed. Likewise, the insert may have a varying diameter so as to most approximate the diameter of the hole in which it is placed.

Figure 2:
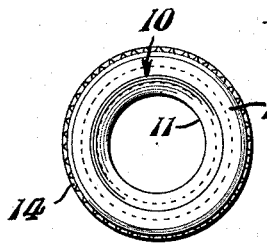
FIG. 2 is a front elevational view of the plug component taken along the lines and arrows II—II in FIG. 1.
Figure 3:
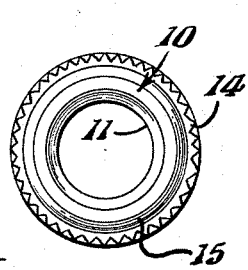
FIG. 3 is a rear elevational view of the plug component taken along the lines and arrows III—III of FIG. 1.

Located at the front or first inserted end of plug 10 is the front flange or shoulder 12 which indicates the pilot diameter of the plug, i.e., flange 12 should snugly fit within the pre-drilled hole in the material and be only slightly smaller than the diameter of the hole. Adjacent to flange 12 is groove 13 which has a smaller outside diameter and functions to catch and hold metal chips and particles which are cut out of the sides of the hole or bore by the adjacent serrated flange 14. Flange or shoulder 14, which encircles the plug similarly to flange 12, has a slightly larger outside diameter than flange 12 so that the serrations cut into the circumference of this flange score or cut into the walls of the hole or bore while plug 10 is pushed into the hole. The serrations are threads or the edges of deep channeled grooves which are arranged according to a helical or spiral curve at a substantially large helix angle, that is, the angle away from the longitudinal axis of the plug. The serrations, being substantially parallel, are oriented in the same direction, or have the same hand, as that of the internal threads 11. Both the front edge of flange 14 and the serrations themselves have sharp edges so as to more easily form corresponding helical grooves in the hole of any reasonably soft material. The rear portion 15 of plug 10 is smoothly and uniformly tapered with the outside diameter being smallest at the end of the plug. In FIGS. 2 and 3, the leading edge of the serrations on the larger diameter flange 14 are shown as small peaks extending completely around the plug.

Figure 5:
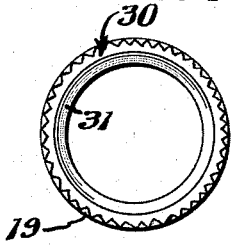
FIG. 5 is a front elevational view of the ring component taken along the lines and arrows V—V in FIG. 4.
Figure 4:
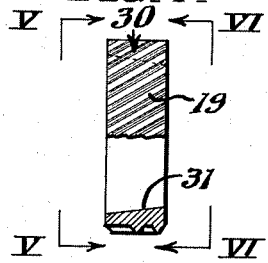
FIG. 4 is a side elevational view, partly in section, showing one specific form of the ring component of this invention.
Figure 6:
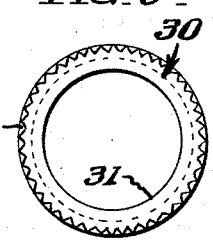
FIG. 6 is a rear elevational view of the ring component taken along the lines and arrows VI—VI in FIG. 4.

Ring component 30, the second component of the insert of this invention, has a smooth tapering internal surface 31 of gradually diminishing diameter as shown in FIGS. 4–6. The tapered internal surface 31 is of such size that ring 30 will fit on and around the tapered portion 15 of plug 10, with the ring extending slightly beyond the plug, as shown in FIG. 7. On the outside surface, ring 30 has a multiplicity of substantially parallel serrations 19 arranged according to a helical curve similar to the serrations on plug 10. However, although at the same helix angle, the ring serrations are positioned at an opposite hand than the plug serrations so that the grooves in the hole formed by these serrations intersect at slightly less than right angles the grooves formed by the serrations on the plug. The effect of the opposing serrations is shown in FIG. 12, wherein flange 14 of the plug made the helical grooves which extend the length of the hole (portions 20 and 22), while ring 30 made the opposing directed grooves of portion 22.

The operation of the insert of this invention is as follows:

The ring 30 is inserted onto the tapered portion 15 of the plug, as shown in FIG. 7, and the assembled insert is threaded fully onto a headed bolt 40 or any other installation tool which has a shoulder against which ring 30 can rest. As shown in FIGS. 8–11 and 13, the insert, with ring 30 projecting slightly beyond the plug 10, is threaded onto a bolt 40 up to the head 41 thereof. The insert is then placed into the hole 50 of the supporting body 48 by means of the pilot diameter flange 12 fitting just within the relatively smooth edges or sides 51 of the hole. The insert and installation bolt 40 are driven or pressed inwardly in the direction of the longitudinal axis of the bolt 40 until the leading edges of the serrations of flange 14, which is larger than flange 12, come in contact with the side of the hole 50. As shown in FIG. 9, the serrations or threads of flange 14 begin to score and otherwise dig out particles or chips 52 from the sides of the hole forming a series of helical grooves which are part of the grooves of portion 22 and all of those of portion 20 as shown in FIG. 12. As the insert advances, the serrations of flange 14 continue to form grooves in the sides 51 of hole. As the plug scores the sides 51 with helical grooves, the insert rotates clockwise (as indicated by the arrow of FIG. 9) in relation to the body 49 and the installation bolt 40 because of the helically shaped serrations. Since the insert is being driven by the threads 11 within the plug 10, the clockwise rotation of the insert causes it to advance on the bolt 40 such that a slight space S is created between the end of ring 30 and the bolt head 41, as seen in FIG. 9. When the insert reaches the depth at which the ring 30 first encounters the sides of the hole, (FIG. 10) disengagement between the tapered portions of the ring and the plug occurs and ring 30 moves rearwardly into space S and against the bolt head 41. As the plug advances further, the ring, driven by the bolt head 41 and having serrations aligned in an opposing direction, rotates counterclockwise (as indicated by the arrow in FIG. 11). The serrations on the ring remove metal chips 53 from the sides 51 of the hole which are accumulated in the space existing in front of the ring and behind flange 14. The cutting action of the ring produces another set of helical grooves in the upper portion 22 (FIG. 12) of the hole which intersect the grooves produced by the plug to form a diamond pattern as shown in portion 22 in FIG. 12. This action continues until the ring is fully within the hole at which time installation is complete (FIG. 11). The space which at one time existed between the ring and bolt head 41, as seen in FIG. 9, now exists between the mating tapered surfaces 15 and 31, of the plug and ring respectively. Because the helical serrations on the plug have a large helix angle, the space S' between the plug and the ring is very small. When a working load or vibration forces are applied to the plug by means of an attaching bolt or screw 45, as shown in FIG. 13, in a direction away from the body 48 or direction of installation, the plug 10 is caused to track back in its grooves until the tapered portion 15 of the plug comes in contact with the ring tapered portion 31. As the plug must rotate counterclockwise in order to be removed and as the ring must rotate clockwise to be removed, and since rotation of both components is prevented by means of the friction locking taper, the insert will resist a force up to that required to strip out all of the helical grooves in the hole. The greater the force applied to the plug through its internal threads 11, the greater is the force applied to the ring through the tapered surfaces; hence, the stronger is the friction locking action between the two components. After the insert is completely in place, the installation bolt 40 may be withdrawn by turning the bolt out of the internal threads 11 of the insert. An attaching structure 55, as shown in FIG. 13, may then be fitted against the supporting body and bolt 45 threaded into the insert so as to hold structure 55 in position.

It should be understood that as the insert of this invention in effect threads the surface of the hole, no pretapping operation is necessary. The insert is preferably composed of a high strength metal so that the sharp serrations can easily cut and score the softer metal or other material into which it is seated. It should be understood that this insert can be used in oversized pre-tapped holes or in irregularly shaped holes as well as any pre-drilled hole made to accommodate the insert. The internal thread of the plug component can be arranged to accommodate any particular fastening bolt or screw as found advantageous under the particular circumstances. It should also be understood that the relative sizes of the portions of the components and the components themselves can be varied without reducing the novel and superior gripping force of the insert of this invention.

While I have shown and described above in considerable detail certain selected embodiments of my invention, it is to be understood that these embodiments are merely illustrative, and that various changes in design, structure, and arrangement may be made without departing from the spirit and scope of my invention as defined in the appended claims.

Having thus described my invention, I claim as follows:

1. A threaded insert adapted for anchorage in a body having a smooth-walled, approximately cylindrical bore extending inwardly from the surface thereof, said insert comprising:

a plug component having a bore with internal threads formed in the wall of said bore, the outside surface of the plug component comprising:
  (a) at the first inserted end a first flange having a relatively smooth circumferential surface of such diameter as to just fit within the bore of the supporting body;
  (b) a slightly larger diameter second flange adjacent the first flange having around its circumference a plurality of helical serrations oriented in a direction corresponding to the direction of the threads in said bore, the helix angle of the serrations in relation to the axis of the plug component being steeper than the helix angle of the internal threads of the plug component, the second flange being of such diameter that the walls of the bore in the supporting body are grooved in one direction;
  (c) a round rearwardly tapering portion extending from the second flange to the end of the plug component; and a ring having a tapering internal bore adapted to fit around the tapering portion of the plug component and having on the outside surface a plurality of helical serrations oriented in a direction substantially opposite to that of the aforementioned serrations, the helix angle of the serrations in relation to the axis of the plug component being steeper than the helix angle of the internal threads of the plug component, the outside diameter of the ring being the same size as that of the second flange of said plug so that the walls of the bore in the supporting body are grooved in a direction substantially opposite to that of the aforementioned grooves.

2. A threaded insert adapted for anchorage in a body having a smooth-walled, approximately cylindrical bore extending inwardly from the surface thereof, said insert comprising:
  a generally cylindrically shaped component having a bore with threads formed in the wall of said bore, the outside surface of said component comprising:
    (a) a first annular flange positioned adjacent to the first inserted end of said component and being of such diameter as to fit snugly within the bore in the supporting body;
    (b) a second annular flange positioned adjacent to the first flange being of slightly larger diameter than said first flange and having around its circumference a plurality of helical serrations oriented away from the longitudinal axis of the component at a steeper angle than that of the internal threads of the plug component and in a direction corresponding to the threads in said bore so as to helically groove the bore in the supporting body when inserted;
    (c) a gradually rearwardly tapering portion extending from the second flange to the end of said component; and
  a ring having a gradually tapering internal bore adapted to fit around the tapered portion of said component, the outside diameter of said ring being the same size as that of said second flange, said ring having on the outside surface a multiplicity of helical serrations oriented in one direction away from the longitudinal axis of said ring at a steeper helix angle than that of the internal threads of the plug component and opposite to that of said aforementioned serrations as to helically groove the bore in the supporting body when inserted whereby the plug is prevented from rotating outwardly a substantial distance by the presence of the ring, said ring being capable of rotating only in the direction opposite to that of the plug.

3. A threaded insert adapted for anchorage in a body having a smooth-walled, approximately uniform diameter, cylindrical bore extending inwardly from the surface thereof, said insert comprising:
  a plug having a bore with threads formed in the wall of said bore, the outer surface of said plug including a last inserted portion tapering toward an end thereof and an earlier inserted portion having a mutiplicity of helical serrations, the helix angle of the serrations in relation to the axis of the plug component being steeper than the helix angle of the internal threads of the plug component, said serrated portion having an outer diameter slightly larger than the diameter of the body bore so that upon insertion the plug inscribes helical grooves in one direction in the wall of the body bore, and
  a ring having a tapering internal bore adapted to fit around the tapering portion of the plug and having on the outside surface a multiplicity of helical serrations oriented in a direction opposite to that of the aforementioned serrations, the helix angle of the serrations in relation to the axis of the plug component being steeper than the helix angle of the internal threads of the plug component, the diameter of said surface being slightly larger than the diameter of the body bore so that upon insertion the ring inscribes helical grooves in a direction opposite to the aforementioned grooves in the wall of the body bore, whereby the plug is prevented from spirally back tracking out of the anchoring body upon frictional engagement of the tapered outer surface of the plug with the tapered bore of the ring because the helical direction of the grooves and serrations of the ring allow that member to rotate only in the direction opposite to that capable of the plug.

4. A threaded insert adapted for anchorage in a body having a smooth-walled, approximately uniform diameter, cylindrical bore extending inwardly from the surface thereof, said insert comprising a plug and ring,
  the plug having a bore with threads formed in the wall of said bore, the outer surface of said plug having a multiplicity of helical serrations with an outer diameter slightly larger than the diameter of the body bore so that upon insertion the plug inscribes helical grooves in one direction in the wall of the body bore, the helix angle of the serrations in relation to the axis of the plug component being steeper than the helix angle of the internal threads of the plug component, and ring engaging means associated with said plug whereby the plug locks with the ring upon rotation of the plug in the body bore in the outward direction, and
  a ring having on the outside surface a multiplicity of helical serrations oriented in a direction opposite to that of the aforementioned serrations with an outer diameter slightly larger than the diameter of the body bore so that upon insertion the ring inscribes helical grooves in one direction in the wall of the body bore, the helix angle of the serrations in relation to the axis of the plug component being steeper than the helix angle of the internal threads of the plug component, and plug engaging means associated with said ring whereby the ring prevents substantial outward rotation of the plug from the body bore by engaging the plug, the ring being capable of rotation out of the body bore only in the direction opposite to that of the plug.

References Cited by the Examiner

UNITED STATES PATENTS

| | | | |
|---|---|---|---|
| 2,019,049 | 10/35 | Hoke | 151—41.73 |
| 2,376,089 | 5/45 | Savageau | 151—16 |
| 2,446,174 | 8/48 | Flynt | 151—41.73 |
| 2,728,370 | 12/55 | Neuschotz | 151—41.73 |

EDWARD C. ALLEN, *Primary Examiner.*